(12) United States Patent
Taylor

(10) Patent No.: US 6,983,344 B2
(45) Date of Patent: Jan. 3, 2006

(54) METHODS, COMPUTER SYSTEMS, AND DEVICE FOR UTILIZING POINTERS OF A ROM IMAGE THAT MAY BE STORED IN VARIOUS FORMATS

(75) Inventor: Duane S. Taylor, Blackburg, VA (US)

(73) Assignee: American Megatrends, Inc., Norcross, GA (US)

( * ) Notice: Subject to any disclaimer, the term of this patent is extended or adjusted under 35 U.S.C. 154(b) by 341 days.

(21) Appl. No.: 10/375,301

(22) Filed: Feb. 27, 2003

(65) Prior Publication Data

US 2004/0172498 A1  Sep. 2, 2004

(51) Int. Cl.
*G06F 13/00* (2006.01)

(52) U.S. Cl. .................. 711/103; 711/154; 711/200

(58) Field of Classification Search ............... 711/103, 711/154, 200
See application file for complete search history.

(56) References Cited

U.S. PATENT DOCUMENTS 5,764,987 A * 6/1998 Eidt et al. .................. 717/100
5,999,989 A * 12/1999 Patel ............................. 710/1
6,105,120 A * 8/2000 Gorissen et al. ............ 711/220
6,718,410 B2 * 4/2004 Slater .......................... 710/66
2004/0150645 A1 * 8/2004 Burrell ........................ 345/467

\* cited by examiner

*Primary Examiner*—Reba I. Elmore
(74) *Attorney, Agent, or Firm*—The Hope Law Firm, LLC.

(57) ABSTRACT

Methods, computer systems, and devices provide for the use of pointers of various formats stored in a ROM image that is initially stored in an on-board ROM device of a computer system. The pointers may be stored in either a first format such as segment:offset or a second format such as flat 32-bit. The flat 32-bit format allows the ROM device and ROM image to exceed one megabyte in size, which permits many modules to be included to allow the ROM image to provide support for a full spectrum of hardware of the computer system. The segment:offset format allows backward compatibility with legacy type systems and software. The format of the pointers is determined so that first format pointers are converted to second format pointers for use in accessing modules of the ROM image. Pointers already stored in the second format are utilized as is to access the modules.

22 Claims, 3 Drawing Sheets

METHODS, COMPUTER SYSTEMS, AND DEVICE FOR UTILIZING POINTERS OF A ROM IMAGE THAT MAY BE STORED IN VARIOUS FORMATS

TECHNICAL FIELD

The present invention is related to the storage of information in read only memory ("ROM") devices. More particularly, the present invention is related to utilizing pointers to locate information stored within a ROM image from a ROM device wherein the pointers may be of various formats to enable the ROM device and ROM image to have various sizes including sizes greater than one megabyte.

BACKGROUND

Computer systems utilize on-board ROM devices to provide the basic input/output system ("BIOS") which enables the computer to boot by interacting with the hardware of the computer system and initializes the hardware for operation with software to be executed by the computer system including an operating system. In providing the initialization and interaction with hardware devices of the computer system, the ROM device includes a ROM image which is the set of information that is stored by the ROM device. The ROM image provides the BIOS boot code and various data modules to support the hardware devices. Typically, the ROM image is copied over to the random access memory ("RAM") of the computer system so that the information of the ROM image may be accessed more quickly from the RAM than from the ROM device itself.

As the types of hardware devices to be supported by the ROM device continues to grow, the size of the ROM device must be able to grow as well to support the additional data modules that must be available. Typically, a computer system is limited to one ROM device to provide all of the necessary data modules, and conventionally, this single ROM device has been less than one megabyte in size. However, the number of hardware devices to be supported has increased so that one megabyte of ROM storage for the data modules is inadequate.

To address this problem, a ROM device may be utilized that is greater in size than one megabyte. However, the ROM device uses linked list pointers to provide the location of the data modules within the ROM device so that the BIOS code can find the modules as they are needed. These linked list pointers are stored in a well-known segment:offset format which became the standard format for linked list pointers for the x86 series of microprocessors. The segment:offset pointers were initially intended to be used by 16 bit microprocessors but processors now exceed this data width so that the segment:offset pointers stored by the ROM image are converted by the BIOS code to flat 32-bit pointers that work well with 32 bit processors.

Unfortunately, the segment:offset format is incapable of representing locations over the one megabyte ceiling for ROM devices. However, flat 32-bit pointers can represent locations over the one megabyte ceiling, but current BIOS codes intended for 32 bit processors are configured to perform a conversion on all linked list pointers of a ROM device where the intent of this conversion is to convert the segment:offset format to the flat 32-bit format. Segment:offset pointers cannot be abandoned altogether because of backward compatibility with existing software and hardware, so the BIOS code must remain capable of handling segment:offset pointers. But if the linked list pointers of the ROM image are already in flat 32-bit format, then the conversion process of the BIOS code results in faulty pointer values being returned. Thus, utilization of a ROM device greater than one megabyte to support the full spectrum of hardware devices has not been possible due to BIOS code configured exclusively for use and conversion of segment:offset format pointers.

SUMMARY

Embodiments of the present invention address these problems and others by determining whether the linked list pointers of the ROM image are in a first format, such as segment:offset, or whether the pointers are already stored in a second format, such as flat 32-bit. If the pointers are already in the second format, then no conversion is done on these pointers and they are used as is to access modules of the ROM image. If the pointers are in the first format, then the normal conversion process is performed to render second format pointers that may then be used to access modules of the ROM image. This allows the BIOS code to continue support for the first format pointers while being able to support ROM images exceeding a given size such as one megabyte through the use of second format pointers.

One embodiment is a method of supporting a ROM device in a computer system wherein information in a ROM image from the ROM device is located by pre-defined pointers. The method involves detecting whether the ROM image includes pointers stored in a first format or a second format. When the ROM image stores pointers in a first format, then the pointers are converted from the first format to the second format and the second format pointers are utilized to locate information in the ROM image. When the ROM image stores pointers in the second format, then the pointers in the second format are used to locate information in the ROM image.

Another embodiment is a computer system including a ROM device wherein information in a ROM image from the ROM device is located by pointers. The computer system includes a memory storing code and a processor that executes the code. Through execution of the code, the processor detects whether the ROM image includes pointers stored in a first format or a second format. The processor converts all pointers from the first format to the second format to access information from the ROM image upon detecting that the pointers are stored in the first format. The processor utilizes the pointers in the second format to access information from the ROM image upon detecting that the pointers are stored in the second format.

Another embodiment is a ROM device. The ROM device includes a ROM image that includes a header having a plurality of fields, and the plurality of fields include an attribute field that has a value indicative of whether pointers stored in the ROM image are in a first format or a second format. A plurality of modules is included in the ROM image, where each module has a location identified by a pointer. Code is included in the ROM image that when executed determines from the attribute field whether the pointers are stored in a first format or a second format and that converts the pointers stored in the first format to the second format.

DETAILED DESCRIPTION

Embodiments of the present invention provide for support of ROM devices of a computer that may utilize a pointer format that allows a size to exceed a certain limit, such as one megabyte, while also supporting ROM devices that store a ROM image that utilizes legacy pointers that are compatible with older BIOS utilities.

Figure 1:
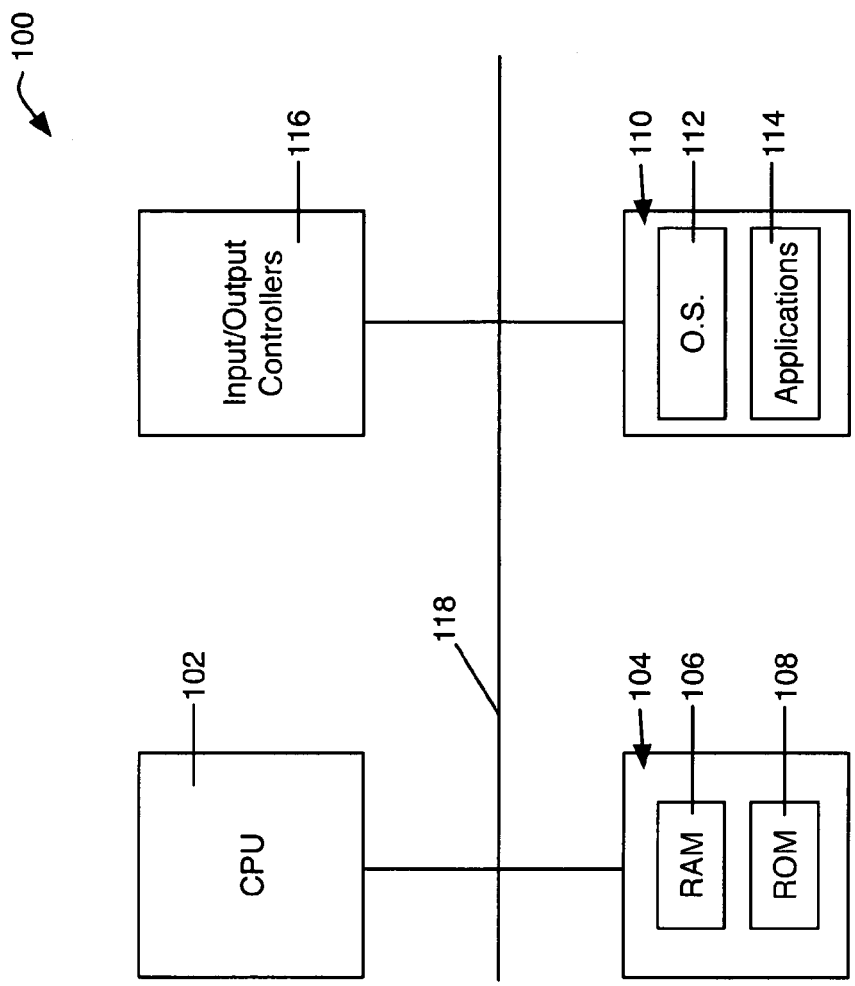
FIG. 1 shows a typical computer system for implementing embodiments of the present invention.

FIG. 1 shows a typical computer system 100 that provides an operational environment for embodiments of the present invention. The computer architecture shown in FIG. 1 illustrates a conventional personal computer, including a central processing unit 102 ("CPU"), a system memory 104, including a random access memory 106 ("RAM") and a read-only memory ("ROM") 108, and a system bus 118 that couples the memory to the CPU 102. A BIOS containing the basic routines that help to transfer information between elements within the computer, such as during startup, is stored in the ROM 108. The personal computer 100 further includes a mass storage device 110 for storing an operating system 112 and application programs 114. The mass storage device 110 is connected to the CPU 102 through a mass storage controller (not shown) connected to the bus 118. The personal computer 100 may also include an input/output controller 116 for receiving and processing input from a number of devices, including a keyboard or mouse (not shown). Similarly, an input/output controller 116 may provide output to a display screen, a printer, or other type of output device.

Figure 2:
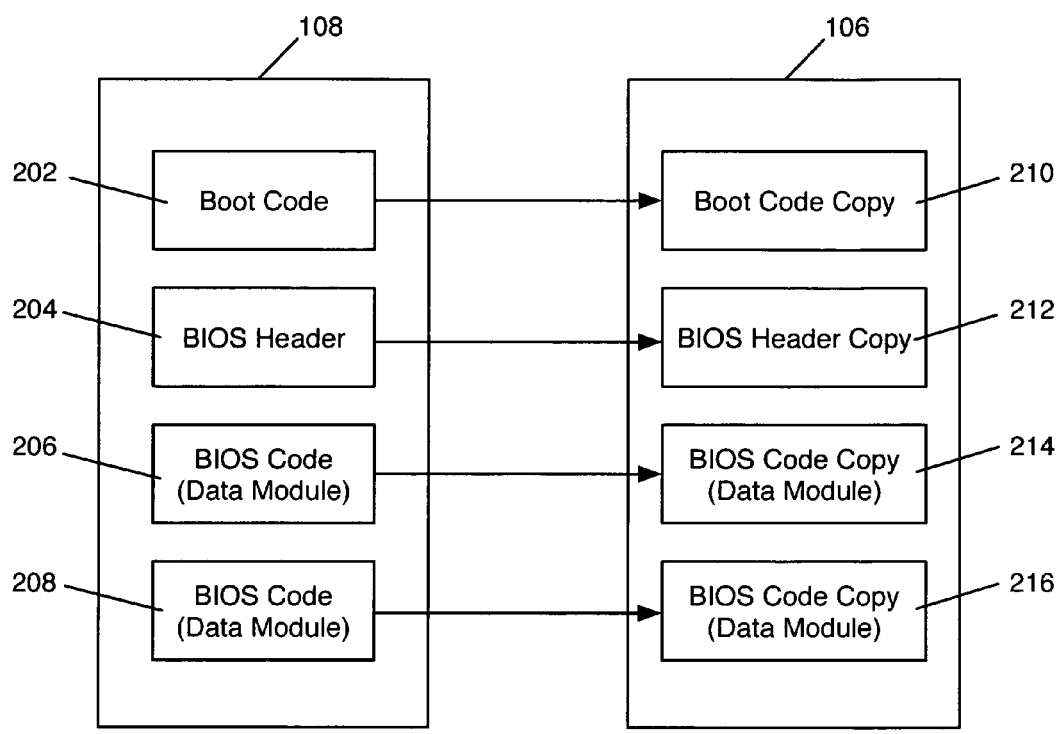
FIG. 2 shows an example of the layout of a ROM image from a ROM device that is copied to a RAM device of the computer system of FIG. 1.

FIG. 2 shows the two components of the system memory, the ROM device 108 and the RAM device 106. The ROM device includes a ROM image that includes boot code 202, a BIOS header 204, and various data modules 206, 208 where each data module contains a data module header. Upon the computer starting to boot up, the boot code 202 being executed from the ROM device 108 by the processor 102 quickly directs the processor 102 to make a complete copy of the ROM image in RAM 106. The ROM image of the RAM 106 includes a boot code copy 210, a BIOS header copy 212, and a copy of the various data modules 214, 216. Once the ROM image is copied to RAM 106, the processor 102 continues to execute the remaining portions of the boot code copy 210 and utilize the BIOS header copy 212 and various data modules 214, 216 from RAM for increased speed of access.

Examples of the BIOS header for two different ROM images are shown below as Tables 1 and 2, and examples of a data module header for the two different ROM images are shown below as Tables 3 and 4. The BIOS header and subsequent data modules with headers form a linked list in that a pointer stored in the BIOS header points to a data module header of the first data module, a pointer in the first data module header points to the next data module header, and so on. These pointers are indicated in Tables 1–4 below and are shown in two different pointer formats, the segment: offset format in Tables 1 and 3 and the flat 32-bit format in Tables 2 and 4.

TABLE 1

| Offset | Length | Description |
| --- | --- | --- |
| | | Compatible Header |
| 14h | WORD | Segment of 1st module |
| 12h | WORD | Offset of 1st module |
| 0Eh | DWORD | BIOS Checksum |
| 0Ch | WORD | Length of BIOS Image in QWORDs |
| 08h | CHAR(4) | Core BIOS Version. ("0800" for example). |
| 00h | CHAR(8) | AMIBIOS Signature 'AMIBIOSC' |
| | | Extended Header |
| -01h | BYTE | Length of the AMIBIOS extended header (this header) in bytes. The value of this field is 0Ah. |
| -02h | BYTE | Length of the extended module header in bytes. The value of this field is 08h. |
| -06h | CHAR(4) | ROM Image version. The value of this field is "0100". |
| -07h | BYTE | ROM Image attribute. Bit7–3 Reserved for future use (set to 0) Bit2 = 0 Image does not contain split modules 1 Image contains split modules Bit1 = 0 Image does not contain generic ROM holes 1 Image contains generic ROM holes Bit0 = 0 Segment: Offset Pointers. |
| -0Ah | BYTE(3) | Reserved for future use |

TABLE 2

| Offset | Length | Description |
| --- | --- | --- |
| | | Compatible Header |
| 12h | DWORD | 32 bit address of 1st module |
| 0Eh | DWORD | BIOS Checksum |
| 0Ch | WORD | Length of BIOS Image in QWORDs |
| 08h | CHAR(4) | Core BIOS Version. ("0800" for example). |
| 00h | CHAR(8) | AMIBIOS Signature 'AMIBIOSC' |
| | | Extended Header |
| -01h | BYTE | Length of the AMIBIOS extended header (this header) in bytes. The value of this field is 0Ah. |
| -02h | BYTE | Length of the extended module header in bytes. The value of this field is 08h. |
| -06h | CHAR(4) | ROM Image version. The value of this field is "0100". |
| -07h | BYTE | ROM Image attribute. Bit7–3 Reserved for future use (set to 0) Bit2 = 0 Image does not contain split modules 1 Image contains split modules Bit1 = 0 Image does not contain generic ROM holes 1 Image contains generic ROM holes Bit0 = 1 Flat 32-Bit Pointers. |
| -0Ah | BYTE(3) | Reserved for future use |

TABLE 3

| Offset | Length | Description |
|---|---|---|
| | | Compatible Header |
| 0Ah | WORD | Destination Segment where the module will be uncompressed. (If it is a PCI Add-On ROM module, this is Device ID). |
| 08h | WORD | Destination Offset where the module will be uncompressed. (If it is a PCI Add-On ROM module, this is Vendor ID). |
| 07h | BYTE | Module Attribute<br>Bit7 = 0 Module is compressed<br>    1 Module is not compressed<br>Bit6 = 0 Module contains data<br>    1 Module is an Add-on ROM link and contains no data<br>Bit5 = 0 Module is complete or is the last piece of a split module<br>    1 Module has been split and more data is contained in next module<br>Bit4 = 0 Module may be split into pieces<br>    1 Module may NOT be split into pieces<br>Bit3–0 Reserved for future use (set to 0) |
| 06h | BYTE | Module Identifier<br>Bit7 = Set if the module is the ROM image information module<br>Bit6–0 = Module ID |
| 04h | WORD | Module Size in bytes. |
| 02h | WORD | Segment of next module. 0FFFFh if last module. |
| 00h | WORD | Offset of next module. 0FFFFh if last module.<br>Extended Header |
| -04h | DWORD | Module Checksum. |
| -08h | DWORD | Module Size in bytes. |

TABLE 4

| Offset | Length | Description |
|---|---|---|
| | | Compatible Header |
| 0Ah | WORD | Destination Segment where the module will be uncompressed. (If it is a PCI Add-On ROM module, this is Device ID). |
| 08h | WORD | Destination Offset where the module will be uncompressed. (If it is a PCI Add-On ROM module, this is Vendor ID). |
| 07h | BYTE | Module Attribute<br>Bit7 = 0 Module is compressed<br>    1 Module is not compressed<br>Bit6 = 0 Module contains data<br>    1 Module is an Add-on ROM link and contains no data<br>Bit5 = 0 Module is complete or contains the last piece of a split module<br>    1 Module has been split and more data is contained in next module<br>Bit4 = 0 Module may be split into pieces<br>    1 Module may NOT be split into pieces<br>Bit3–0 Reserved for future use (set to 0) |
| 06h | BYTE | Module Identifier<br>Bit7 = Set if the module is the ROM image information module<br>Bit6–0 = Module ID |
| 04h | WORD | Module Size in bytes. |
| 00h | WORD | 32-bit address of next module. 0FFFFFFFFh if last module.<br>Extended Header |
| -04h | DWORD | Module Checksum. |
| -08h | DWORD | Module Size in bytes. |

Upon the ROM image being copied into RAM 106, the linked list pointers that are retrieved when a new data module is needed from RAM 106 must undergo a well-known normalization process so that they correspond to the proper location in RAM 106. This normalization process is discussed below with reference to FIG. 3.

The linked list pointers that are stored in the BIOS header and data module headers may be stored in one of various formats. For example, the pointers may be stored in the segment:offset format or the flat 32-bit format. Because the BIOS code must convert segment:offset pointers to flat 32-bit format before use but must use flat 32-bit pointers as is, it must be detected which format the pointers are stored in. This may be done in several ways. One way to detect the format is to set a bit value in the BIOS header during the build process for the ROM image to indicate one format versus another. For example, a zero value may indicate segment:offset while a one value may indicate flat 32-bit.

The BIOS header of Table 1 has an attribute byte at offset –07h that includes a bit whose purpose is to indicate the format of the pointers. In the example of Table 1, this bit is bit position zero of the attribute byte, and its value is zero thereby indicating that the format is segment:offset. From this bit value, the BIOS code recognizes that the pointers must be converted to flat 32-bit to be useful. The BIOS header of Table 2 has the same attribute byte at offset –07h with the zero bit position providing the pointer format, which is flat 32-bit.

In Table 1, the bit value indicating segment:offset format provides the signal necessary for the BIOS code to recognize that the data word at offset 14h represents the segment portion of the pointer to the first data module header and the data word at offset 12h represents the offset of the pointer to the first data module header. Additionally, this bit value of Table 1 indicating segment:offset format provides the signal necessary for the BIOS code to recognize that in Table 3, the data word at offset 02h represents the segment portion of the pointer to the next data module header and the data word at offset 00h represents the offset portion of the pointer to the next data module header.

Likewise, in Table 2, the bit value indicating flat 32-bit format provides the signal necessary for the BIOS code to recognize that the double word at offset 12h represents the flat 32-bit pointer to the first data module header. Additionally, this bit value of Table 2 indicating the flat 32-bit format provides the signal necessary for the BIOS code to recognize in Table 4 that the double word at offset 00h represents the flat 32-bit pointer to the next data module header.

To further provide for backward compatibility with previous BIOS code and BIOS header formats, a version indicator may be provided to signal to the BIOS code what version of the ROM image is present so that the BIOS code may operate with ROM images having BIOS headers that provide the attribute byte where bit position zero indicates the pointer format or with other BIOS headers where the attribute byte is not present or is present but has other formats that may or may not include a bit value representative of pointer format. This version indicator is shown in the BIOS headers of Tables 1 and 2 where the version indicator is four characters in length at offset –06h. For example, if it is determined that the attribute field is not present, then the BIOS code may be configured to automatically apply a conversion to convert pointers to the second format due to an assumption that they are initially stored in a first format.

Figure 3:
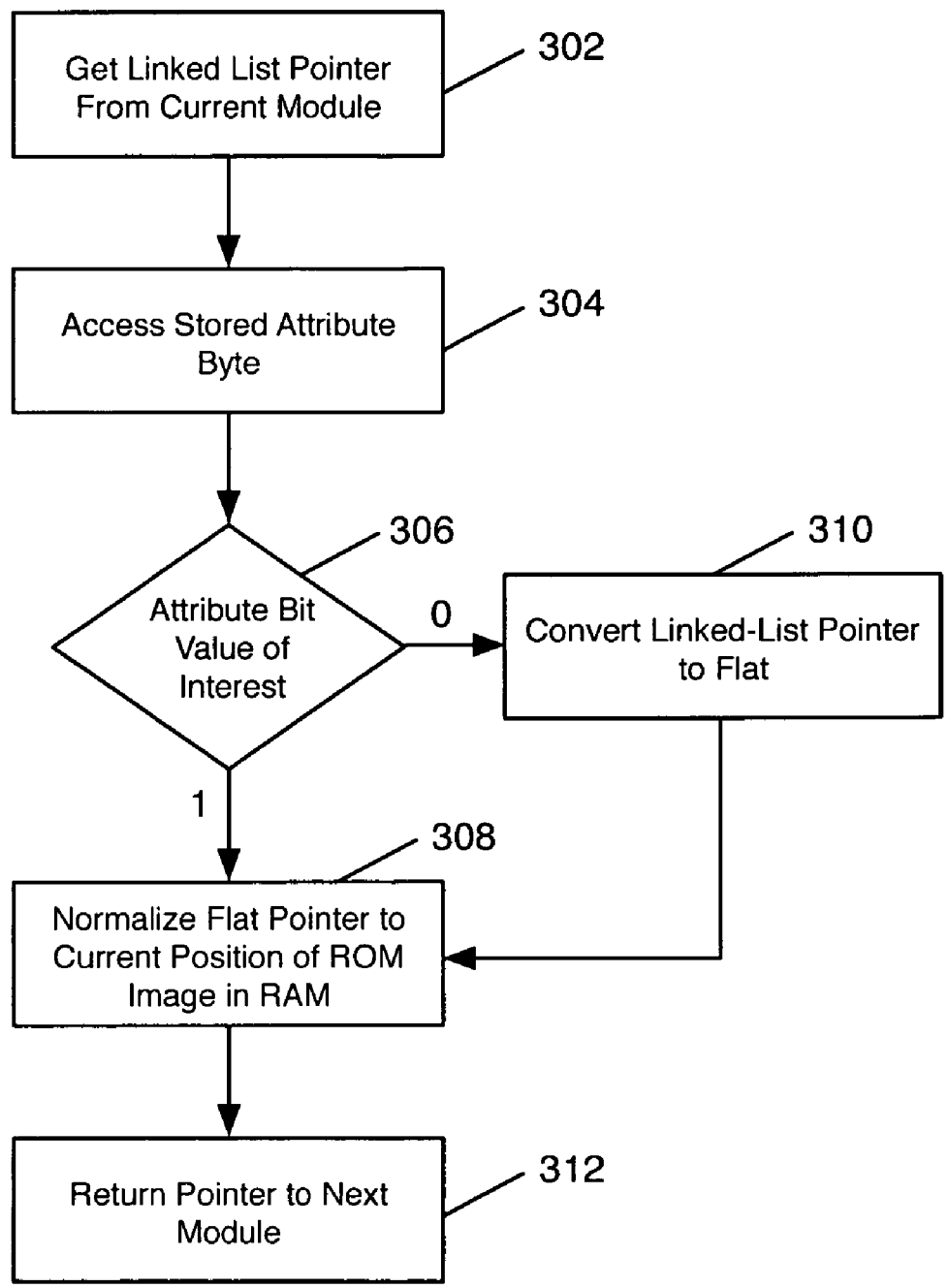
FIG. 3 shows an example of the logical operations performed by the BIOS code of the ROM image of FIG. 2 when a module of the ROM image is needed.

FIG. 3 shows the logical operations of one example of BIOS retrieval code included in the BIOS code of the ROM image. The BIOS retrieval code is called by a main routine of the BIOS code whenever a data module needs to be accessed for some purpose. While the next data module in the linked list may not be the data module that is needed, the BIOS retrieval code of FIG. 3 may be repeated to cycle through the data modules until the data module of interest is found.

The logical operations of one iteration of the BIOS retrieval code begin at pointer operation 302 where the BIOS retrieval code obtains the linked list pointer. This pointer is obtained from the header of the data module that has been most recently accessed, or it is obtained from the BIOS header if no data module has yet been accessed or if the data module to be accessed is prior to the current data module in the linked list. The BIOS header can always be found without resorting to the BIOS retrieval code operations of FIG. 3 as the BIOS header position is fixed and is known by the BIOS code.

Upon accessing the linked list pointer from the BIOS header or from a data module header, the attribute byte that has been stored in RAM is accessed at access operation 304. For example, the attribute byte may be initially read from the ROM image upon copying the image to RAM and the attribute byte is stored in a known location where it can be quickly accessed by the BIOS retrieval code. Upon accessing the attribute byte, query operation 306 detects whether the bit of the attribute byte that signals pointer format is a zero value or a one value. For example, the zero value of this bit may indicate the pointer format is of a first format such as segment:offset, and the logical operation proceeds to conversion operation 310. Another possibility is that the one value of this bit indicates the pointer format is of a second format such as flat 32-bit, and the logical operation proceeds directly to normalization operation 308.

Where the first format is indicated by the zero value, the conversion operation 310 converts the first pointer format to the second pointer format. For example, where the first format is segment:offset and the second format is flat 32-bit, then the segment:offset format is converted to the flat 32-bit format such as by multiplying the most significant word which is the segment portion by 16 and then adding it to the least significant word which is the offset portion. After having converted the pointer from the first format to the second format, the logical operations proceed to normalization operation 308.

At the well-known normalization operation 308, the BIOS retrieval code normalizes the second format pointer so that it points to the proper location in RAM. The pointers that are initially stored in the ROM device are configured for accessing from the linked list based on the reference position within the ROM device. Once the ROM image is copied to RAM, the linked list maintains the same order but the reference position within the RAM device is different than it was for the ROM device so the pointer values are normalized to correspond with the RAM positioning.

After the second format pointer has been normalized to the RAM position, the pointer is returned from the BIOS retrieval code to the main routine of the BIOS code at return operation 312 so that the main routine may utilize the returned pointer to access the necessary data module from RAM. Because the conversion operation 310 operates only upon first format pointers to convert them to second format pointers, faulty pointers do not result from applying such a conversion to pointers already stored in the second format. Accordingly, the BIOS retrieval code of FIG. 3 supports both ROM devices initially storing pointers in the first format as well as ROM devices initially storing pointers in the second format. Thus, ROM devices of various sizes may be supported, including those over one megabyte in total storage capacity since various pointer formats may be used.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of supporting a ROM device in a computer system wherein information in a ROM image from the ROM device is located by pre-defined pointers, comprising:
   detecting whether the ROM image includes pointers stored in a first format or a second format;
   when the ROM image stores pointers in a first format, then converting the pointers from the first format to the second format and utilizing the second format pointers to locate information in the ROM image; and
   when the ROM image stores pointers in the second format, then utilizing the pointers in the second format to locate information in the ROM image.

2. The method of claim 1, wherein detecting whether the ROM image includes pointers stored in a first format or a second format comprises determining the value of an attribute field in a header of the ROM image.

3. The method of claim 1, wherein utilizing the pointers in the second format to locate information in the ROM image when the ROM image stores pointers in the second format comprises accessing regions of the ROM image over one megabyte from an initial region of the ROM image.

4. The method of claim 3, further comprising:
prior to determining the value of an attribute field in the header of the ROM image, determining the value of a version field in the header to determine whether to determine the value of the attribute field; and
when the value of the version field indicates not to determine the value of the attribute field, then converting the pointers to the second format.

5. The method of claim 1, further comprising:
storing the ROM image in a RAM device;
normalizing the second format pointer to the current position of the ROM image in the RAM device; and
wherein utilizing the second format pointers to locate information in the ROM image comprises locating information within the ROM image stored in the RAM device.

6. The method of claim 1, wherein determining whether the ROM image includes pointers stored in a first format or a second format is performed each time a new module of the ROM image located by a pointer is being accessed.

7. The method of claim 1, wherein when the pointers are stored in the first format, the pointers are converted to the second format only upon an attempt to access a module that is located by the pointer to be converted.

8. The method of claim 1, wherein the first format is a segment:offset format and wherein the second format is a flat 32-bit format.

9. A computer system including a ROM device wherein information in a ROM image from the ROM device is located by pointers, comprising:
a memory storing code;
a processor that executes the code to:
detect whether the ROM image includes pointers stored in a first format or a second format;
convert all pointers from the first format to the second format to access information from the ROM image upon detecting that the pointers are stored in the first format; and
utilize the pointers in the second format to access information from the ROM image upon detecting that the pointers are stored in the second format.

10. The computer system of claim 9, wherein the processor executes the code to detect whether the ROM image includes pointers stored in a first format or a second format by reading an attribute field of a header of the ROM image.

11. The computer system of claim 9, wherein the processor utilizes the pointers in the second format to access information from the ROM image in regions beyond one megabyte from an initial region upon detecting that the pointers are stored in the second format.

12. The computer system of claim 9, wherein the processor executes the code such that prior to the processor determining the value of an attribute field in the header of the ROM image, the processor determines the value of a version field in the header to determine whether to determine the value of the attribute field, and when the value of the version field indicates not to determine the value of the attribute field, then the processor converts the pointers to second format.

13. The computer system of claim 9, further comprising:
a RAM device that stores the ROM image from the ROM device; and
wherein the processor executes the code to normalize the second pointer to the current position of the ROM image in the RAM device.

14. The computer system of claim 9, wherein the processor executes the code to determine whether the ROM image includes pointers stored in a first format or a second format each time a new module of the ROM image located by a pointer is being accessed.

15. The computer system of claim 9, wherein when the processor detects that the pointers are stored in the first format, the processor converts the pointers to second format only upon the processor attempting to access a module that is located by the pointer to be converted.

16. The computer system of claim 9, wherein the first format is a segment:offset format and wherein the second format is a flat 32-bit format.

17. A ROM device that comprises a ROM image, the ROM image comprising:
a header having a plurality of fields, the plurality of fields including an attribute field that has a value indicative of whether pointers stored in the ROM image are in a first format or a second format;
a plurality of modules, wherein each module has a location identified by a pointer; and
code that when executed determines from the attribute field whether the pointers are stored in the first format or the second format and that converts the pointers stored in the first format to the second format.

18. The ROM device of claim 17, wherein the plurality of fields includes a version field and wherein the code when executed determines from the version field whether to consider the attribute field and that converts the pointers to the second format when the version field indicates the attribute field should not be considered.

19. The ROM device of claim 17, wherein the plurality of modules have a total size in excess of one megabyte.

20. The ROM device of claim 17, wherein the code when executed determines whether the pointers are stored in the first format or the second format each time a new module of the ROM device located by a pointer is being accessed.

21. The ROM device of claim 17, wherein when the pointers are stored in the first format, the code when executed converts the pointers to the second format only upon an attempt to access a module that is located by the pointer to be converted.

22. The ROM device of claim 17, wherein the first format is a segment:offset format and wherein the second format is a flat 32-bit format.

* * * * *